(12) United States Patent
Sekido

(10) Patent No.: US 8,882,361 B2
(45) Date of Patent: Nov. 11, 2014

(54) THRUST ROLLER BEARING

(75) Inventor: Shinichi Sekido, Namegata (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/883,020

(22) PCT Filed: Jan. 6, 2012

(86) PCT No.: PCT/JP2012/050162
§ 371 (c)(1),
(2), (4) Date: May 2, 2013

(87) PCT Pub. No.: WO2012/098939
PCT Pub. Date: Jul. 26, 2012

(65) Prior Publication Data
US 2013/0287331 A1  Oct. 31, 2013

(30) Foreign Application Priority Data
Jan. 18, 2011  (JP) .................................. 2011-7771

(51) Int. Cl.
| F16C 19/30 | (2006.01) |
| F16C 19/38 | (2006.01) |
| F16C 33/51 | (2006.01) |
| E02F 9/12 | (2006.01) |

(52) U.S. Cl.
CPC ........... F16C 19/305 (2013.01); *F16C 2300/14* (2013.01); F16C 19/381 (2013.01); *F16C 33/51* (2013.01); *F16C 33/513* (2013.01); *F16C 19/30* (2013.01); E02F 9/123 (2013.01)
USPC ........................... 384/623; 384/591; 384/621

(58) Field of Classification Search
USPC ............. 384/44, 51, 296, 420, 455, 548, 523, 384/572–573, 590, 598, 614, 618, 621–623, 384/591; 29/898.062, 898.064
See application file for complete search history.

(56) References Cited

U.S. PATENT DOCUMENTS

| 2,417,559 | A | * | 3/1947 | Larson ........................... 384/573 |
| 2,978,282 | A | * | 4/1961 | Fisher ............................. 384/623 |
| 3,501,212 | A | | 3/1970 | Stenert et al. |
| 3,938,866 | A | * | 2/1976 | Martin ........................... 384/623 |
| 3,966,284 | A | * | 6/1976 | Martin ........................... 384/623 |
| 6,619,845 | B2 | * | 9/2003 | Murata ............................ 384/44 |

(Continued)

FOREIGN PATENT DOCUMENTS

| EP | 1881213 A1 * | 1/2008 | .............. F16C 19/32 |
| GB | 2 378 988 A | 2/2003 | |
| JP | 2005-171724 A | 6/2005 | |

*Primary Examiner* — Marcus Charles
(74) *Attorney, Agent, or Firm* — Mattingly & Malur, PC

(57) ABSTRACT

Between an inner race and an outer race, a plurality of thrust rollers supporting the inner race and the outer race capable of relative rotation are provided. A thrust cage for retaining each thrust roller capable of rolling is composed of a plurality of cage separate bodies separated and arranged in a roller accommodating space. The cage separate body has two projecting portions having a semicircular cross-sectional shape provided on an outer wall surface of an outside connecting portion spaced apart from each other in a peripheral direction of the outer race. With relative rotation between the inner race and the outer race, when each cage separate body is displaced toward an inner peripheral surface side of the outer race, a top portion of each projecting portion is brought into contact with the inner peripheral surface of the outer race.

5 Claims, 11 Drawing Sheets

(56) References Cited

U.S. PATENT DOCUMENTS

| | | | |
|---|---|---|---|
| 6,779,923 B2 * | 8/2004 | Murata | 384/44 |
| 7,845,857 B2 * | 12/2010 | Shattuck et al. | 384/623 |
| 7,963,703 B2 * | 6/2011 | Takamizawa et al. | 384/618 |
| 2006/0120646 A1 * | 6/2006 | Suzuki | 384/470 |

* cited by examiner

THRUST ROLLER BEARING

TECHNICAL FIELD

The present invention relates to a thrust roller bearing suitably used for a revolving bearing and the like of a revolving type construction machine such as a hydraulic excavator, a hydraulic crane and the like.

BACKGROUND ART

In general, a revolving type construction machine such as a hydraulic excavator, a hydraulic crane or the like is formed of a lower traveling structure as a base, an upper revolving structure as a revolving body that is rotatably mounted on the lower traveling structure, and a working mechanism liftably provided on the front portion side of the upper revolving structure.

The revolving type construction machine has a revolving bearing called so-called revolving ring between the lower traveling structure and the upper revolving structure. The upper revolving structure is revolved and driven in an arbitrary direction on the lower traveling structure by the revolving bearing.

The revolving bearing is composed of a rolling bearing such as a ball bearing, a realer bearing and the like, for example. In the case of an ultra large-sized construction machine, for example, the revolving bearing is composed of a three-row roller bearing formed by combining a two-row thrust roller bearing and a one-row radial roller bearing. Therefore, the revolving bearing can ensure a sufficient load capacity (Patent Document 1).

The thrust roller bearing constituting various types of rotation supporting mechanisms including the revolving bearing is composed of an inner race, an outer race provided on the outer periphery side of the inner race and forming an annular roller accommodating space between itself and the inner race, a plurality of rollers arranged capable of rolling in the roller accommodating space around the roller center axis perpendicular to axes of the inner race and the outer race and extending in the radial direction and a cage provided in the roller accommodating space for retaining each roller capable of rolling. The thrust roller bearing is configured to support the inner race and the outer race capable of relative rotation by rolling of each roller in the roller accommodating space.

On the other hand, a thrust roller bearing configured such that a cage for retaining each roller is configured by a plurality of cage separate bodies arranged separately in the roller accommodating space over the entire periphery of the roller accommodating space is also known (Patent Document 2).

PRIOR ART DOCUMENTS

Patent Documents

Patent Document 1: Japanese Patent Laid-Open No. 2005-171724 A
Patent Document 2: U.S. Pat. No. 3,501,212

SUMMARY OF THE INVENTION

The inventors examined the use of the separate cages according to Patent Document 2 as a cage for the revolving bearing, for example. However, if the cage according to Patent Document 2 is used as a cage for the revolving bearing as it is, each roller and each cage separate body misalign with each other, which causes problems such that an inner surface of a pocket of the cage separate body is abnormally worn or can be easily damaged.

That is, each cage separate body is arranged continuously in the peripheral direction in the annular roller accommodating space and thus, each cage separate body moves in the peripheral direction with the rollers in the roller accommodating space with relative rotations of the inner race and the outer race. At this time, a force to press the cage separate body to an inner peripheral surface of the outer race is applied to the cage separate body from the cage separate bodies adjacent in the peripheral direction. Therefore, the cage separate body is displaced also on the inner peripheral surface side of the outer race while moving in the peripheral direction in the roller accommodating space and both end edge portions of an outer wall surface opposed to the inner peripheral surface of the outer race in the cage separate body are brought into contact with (sliding) the inner peripheral surface of the outer race.

The separate cage according to Patent Document 2 is configured such that a distance dimension between an end edge portion on one side in the peripheral direction in the outer wall surface of each cage separate body and the roller center axis and the distance dimension between an end edge portion on the other side in the peripheral direction in the outer wall surface of the cage separate body and the roller center axis are different from each other. Thus, if the both end edge portions of the outer wall surface of the cage separate body are brought into contact with the inner peripheral surface of the outer race, a moving direction of the cage separate body does not match a rolling direction of the roller any more, and the cage separate body (the center axis of the pocket thereof) and the roller (the center axis thereof) are misaligned with each other.

In order to prevent such misalignment, the inventors conceived of a configuration in which the distance dimension between the end edge portion on one side in the peripheral direction in the outer wall surface of the cage separate body and the roller center axis and the distance dimension between the end edge portion on the other side in the peripheral direction in the outer wall surface of the cage separate body and the roller center axis are set equal. With this arrangement, the cage separate body is displaced to the inner peripheral surface side of the outer race, and if the both end edge portions of the outer wall surface of the cage separate body are brought into contact with the inner peripheral surface of the outer race, the rolling direction of the roller can be made to match the moving direction of the cage separate body, and misalignment can be prevented.

However, if the distance dimensions are set equal as described above, the dimension of the cage separate body relating to the peripheral directions of the inner race and the outer race becomes larger, and an interval between the rollers adjacent in the peripheral direction also increases. As a result, the number of rollers that can be incorporated in the thrust roller bearing decreases, and there is a problem that a load capacity of the thrust roller bearing becomes smaller.

In view of the above-discussed problems, it is an object of the present invention to provide a thrust roller bearing which can realize both prevention of misalignment and ensuring of a load capacity.

(1) In order to solve the above-described problems, the present invention is applied to the thrust roller bearing provided with an inner race, an outer race provided on an outer periphery side of the inner race and forming an annular roller accommodating space between itself and the inner race, a plurality of rollers arranged in the roller accommodating space, capable of rolling around a roller center axis (X-X) are perpendicular to a revolving axis (O-O) of the inner race and the outer race and extending in the radial direction and supporting the inner race and the outer race capable of relative rotation, and a cage provided in the roller accommodating space for retaining each roller capable of rolling.

The characteristic of the construction adopted in the present invention is that the cage is composed of a plurality of cage separate bodies separated and arranged in the roller accommodating space over the entire periphery of the roller accommodating space; and each cage separate body is configured such that two projecting portions projecting toward the inner peripheral surface side of the outer race are provided spaced apart from each other in the peripheral direction of the outer race on an outer wall surface opposed to the inner peripheral surface of the outer race; and a top portion of each projecting portion is brought into contact with the inner peripheral surface of the outer race when each of the cage separate bodies is displaced toward the inner peripheral surface of the outer race.

With this arrangement, when the top portions of the two projecting portions provided on the outer wall surface of the cage separate body are brought into contact with the inner peripheral surface of the outer race, the rolling direction of the roller and the moving direction of the cage separate body are made to match each other that misalignment between each roller and each cage separate body can be prevented. Therefore, abnormal wear or damage on the inner surface of the pocket of the cage separate body can be prevented, and durability and reliability of the thrust roller bearing can be improved.

In this case, since each projecting portion projects from the outer wall surface of the cage separate body toward the inner peripheral surface of the outer race, misalignment can be prevented without increasing the dimension of the cage separate body relating to the peripheral directions of the inner race and the outer race. In other words, by providing the two projecting portions, misalignment can be prevented without decreasing the number of rollers incorporated in the thrust roller bearing. Therefore, ensuring of the load capacity of the thrust roller bearing and prevention of misalignment can be both realized.

(2) According to the present invention, when the top portion of each of the projecting portions is brought into contact with the inner peripheral surface of the outer race, a virtual line (Y-Y) connecting contact points (S) between the inner peripheral surface of the outer race and each of the projecting portions is configured to be perpendicular to the roller center axis (X-X). With this arrangement, when the top portion of each of the projecting portions is brought into contact with the inner peripheral surface of the outer race, the rolling direction of the roller and the moving direction of the cage separate body can be made to match each other.

(3) According to the present invention, assuming that a distance dimension between one of the projecting portions of the projecting portions and the roller center axis (X-X) is (A), a distance dimension between the other projecting portion of the projecting portions and the roller center axis (X-X) is (B), a height dimension of one of the projecting portions is (C), and a height dimension of the other projecting portion is (D), the dimensions are set to A=B, C=D. With this arrangement, when the top portion of each of the projecting portions is brought into contact with the inner peripheral surface of the outer race, the rolling direction of the roller and the moving direction of the cage separate body can be made to match each other.

(4) According to the present invention, assuming a radius of the roller is (R), 0.6R ≤A=B ≤R is set. With this arrangement, since the distance dimension (A) and the distance dimension (B) are set at 0.6 times or more and 1 time or less of the radius (R) of the roller, a distance between the inner peripheral surface of the outer race and the contact point (S) with each projecting portion can be made appropriate. As a result, when the top portion of each of the projecting portions is brought into contact with the inner peripheral surface of the outer race, a state where the rolling direction of the roller and the moving direction of the cage separate body are matched each other can be maintained stably.

(5) According to the present invention, the cage is configured by a plurality of cage separate bodies separated and arranged in the roller accommodating space over the entire periphery of the roller accommodating space; each of the cage separate bodies is configured such that one projecting portion projecting toward the inner peripheral surface side of the outer race is provided spaced apart from the roller center axis (X-X) in the peripheral direction of the outer race on an outer wall surface opposed to the inner peripheral surface of the outer race; when each cage is displaced toward the inner peripheral surface of the outer race, an end edge portion on the side opposite to the projecting portion sandwiching the roller center axis (x-x) in the outer wall surface and the top portion of the projecting portion is brought into contact with the inner peripheral surface of the outer race, and when a top portion of the projecting portion and the end edge portion of the outer wall surface are brought into contact with the inner peripheral surface of the outer race; a tangent (Z-Z) with the inner peripheral surface at an intersection (K) between the roller center axis (X-X) and the inner peripheral surface of the outer race is configured to be perpendicular to the roller center axis (X-X).

With this arrangement, when the top portion of the one projecting portion provided on the outer wall surface of the cage separate body and the end edge portion of the outer wall surface are brought into contact with the inner peripheral surface of the outer race, the rolling direction of the roller and the moving direction of the cage separate body can be made to match each other, and misalignment between each roller and each cage separate body can be prevented. As a result, abnormal wear and damage on the inner surface of the pocket of the cage separate body can be prevented, and durability and reliability of the thrust roller bearing can be improved.

Since the projecting portion is configured to project toward the inner peripheral surface of the outer race from the outer wall surface of the cage separate body, misalignment can be prevented without increasing the dimension of the cage separate body relating to the peripheral directions of the inner race and the outer race. In other words, by providing one projecting portion, misalignment can be prevented without decreasing the number of rollers incorporated in the thrust roller bearing. As a result, ensuring of the load capacity of the thrust roller bearing and prevention of misalignment can be both realized.

BRIEF DESCRIPTION OF THE DRAWINGS

FIG. 2 is a sectional view illustrating the thrust roller bearing in FIG. 1 together with a revolving drive device, a cylindrical body, a revolving frame and the like.

FIG. 7 is a plan view illustrating one cage separate body, the roller and the like.

MODE FOR CARRYING OUT THE INVENTION

Figure 1:
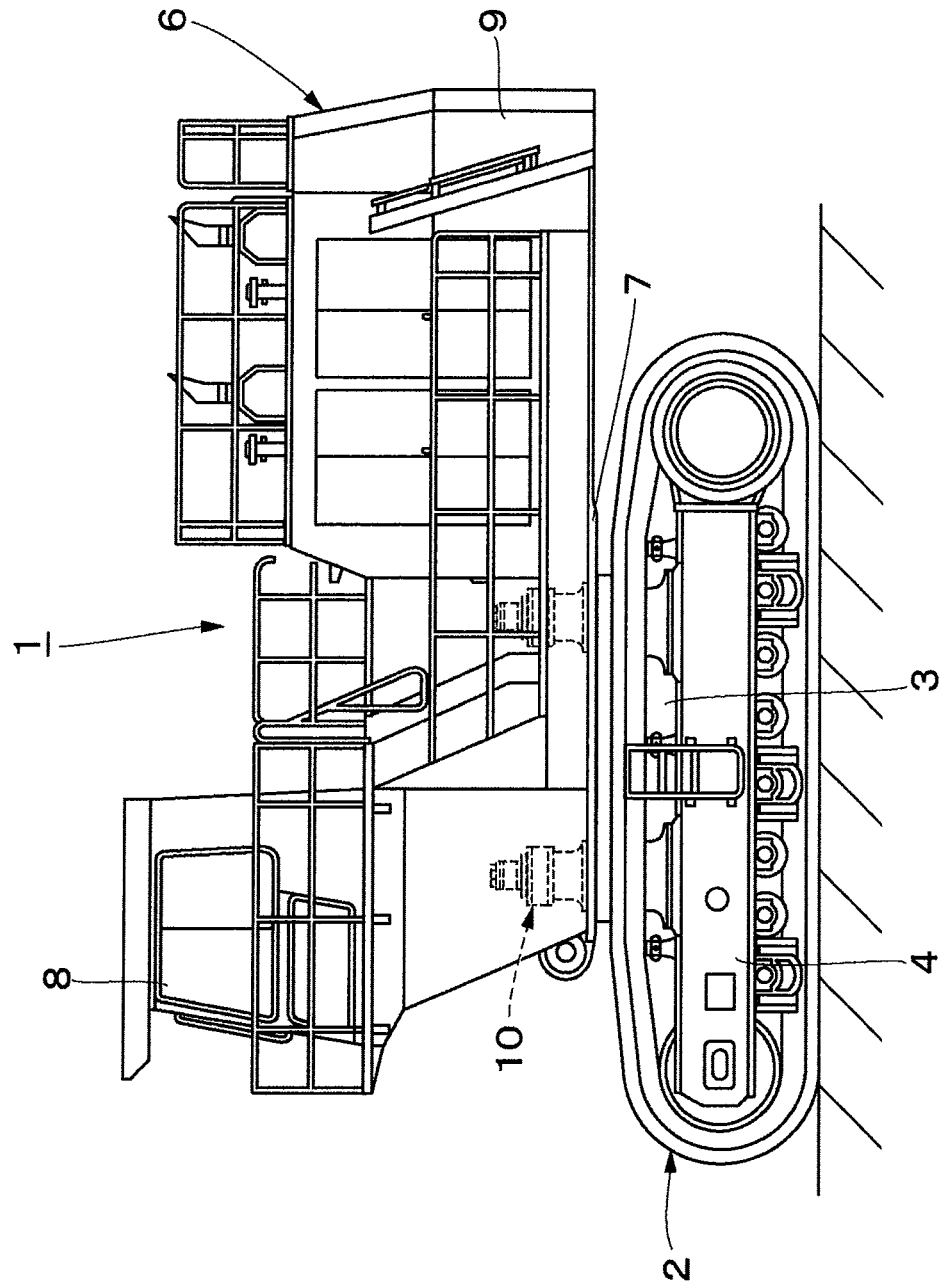
FIG. 1 is a front view illustrating a hydraulic excavator in which a thrust roller bearing according to a first embodiment of the present invention is incorporated in a state where a working mechanism is removed.

Hereafter, embodiments of a thrust roller bearing according to the present invention will be described in detail with reference to the accompanying drawings by taking a case in which the thrust roller bearing is applied to a revolving bearing of an ultra large-sized hydraulic excavator as an example.

FIGS. 1 to 8 illustrate the thrust roller bearing according to a first embodiment of the present invention.

In the figures, designated at 1 is a hydraulic excavator as a construction machine, and the hydraulic excavator 1 is composed of an automotive crawler-type lower traveling structure 2, an upper revolving structure 6 provided on the lower traveling structure 2 which will be described later, and a working mechanism (not shown) provided on the front portion side of the upper revolving structure 6. Between the lower traveling structure 2 as a base and the upper revolving structure 6 as a revolving body, a revolving device 10 which will be described later for revolving the upper revolving structure 6 on the lower traveling structure 2 is provided.

The lower traveling structure 2 has a center frame 3 located at the center part in the left-and-right direction and left and right side frames 4 (only the left side is shown) located on the both left and right sides of the center frame 3 and extending in the front-and-rear direction, and a cylindrical body 5 which will be described later is provided on a top plate 3A constituting the center frame 3.

Figure 2:
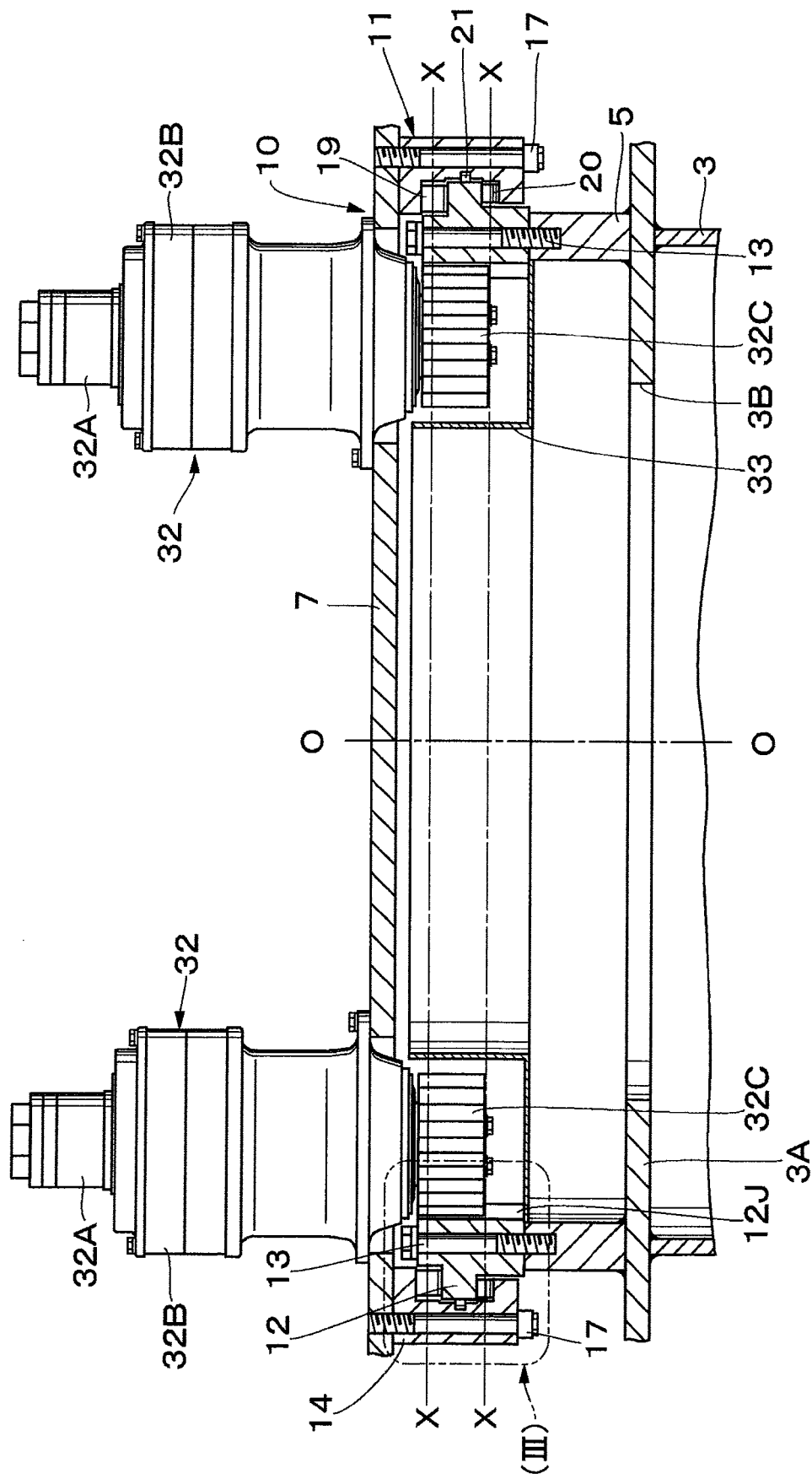

As illustrated in FIG. 2, the cylindrical body 5 for mounting the upper revolving structure is provided protruding above the top plate 3A of the center frame 3, and the cylindrical body 5 is for mounting an inner race 12 of a revolving bearing 11 which will be described later thereon. The cylindrical body 5 has a large-diameter cylindrical shape and fixed on the top plate 3A of the center frame 3 around a revolving axis O-O which becomes a revolving center by using means such as welding or the like. On the top plate 3A of the center frame 3, an opening 3B for working is formed at a position on the inner periphery side of the cylindrical body 5.

The upper revolving structure 6 is provided on the cylindrical body 5 of the lower traveling structure 2 rotatably through the revolving device 10, and the upper revolving structure 6 includes a revolving frame 7 which becomes a base, a cab 8 provided on the front left side of the revolving frame 7 and defining an operating room, and a counterweight 9 provided on the rear end side of the revolving frame 7.

Designated at 10 is a revolving device provided between the lower traveling structure 2 and the upper revolving structure 6, and the revolving device 10 is to revolve the upper revolving structure 6 on the lower traveling structure 2 (center frame 3). The revolving device 10 is composed of the revolving bearing 11 which will be described later, a revolving drive device 32 and the like.

Subsequently, as the revolving bearing 11 according to the first embodiment, a thrust roller bearing will be explained as an example.

That is, designated at 11 is a revolving bearing as a thrust roller bearing provided between the cylindrical body 5 of the lower traveling structure 2 and the revolving frame 7 of the upper revolving structure 6, and the revolving bearing 11 is to support the upper revolving structure 6 with respect to the lower traveling structure 2 capable of relative rotation around the revolving axis O-O.

The revolving bearing 11 is composed as a three-row roller bearing obtained by combining a two-row thrust roller bearing and a one-row radial roller bearing. Such revolving bearing 11 is composed of the inner race 12 which will be described later, an outer race 14, thrust rollers 19 and 20, a radial roller 21, thrust cages 22 and 26, and a radial cage 29.

Figure 3:
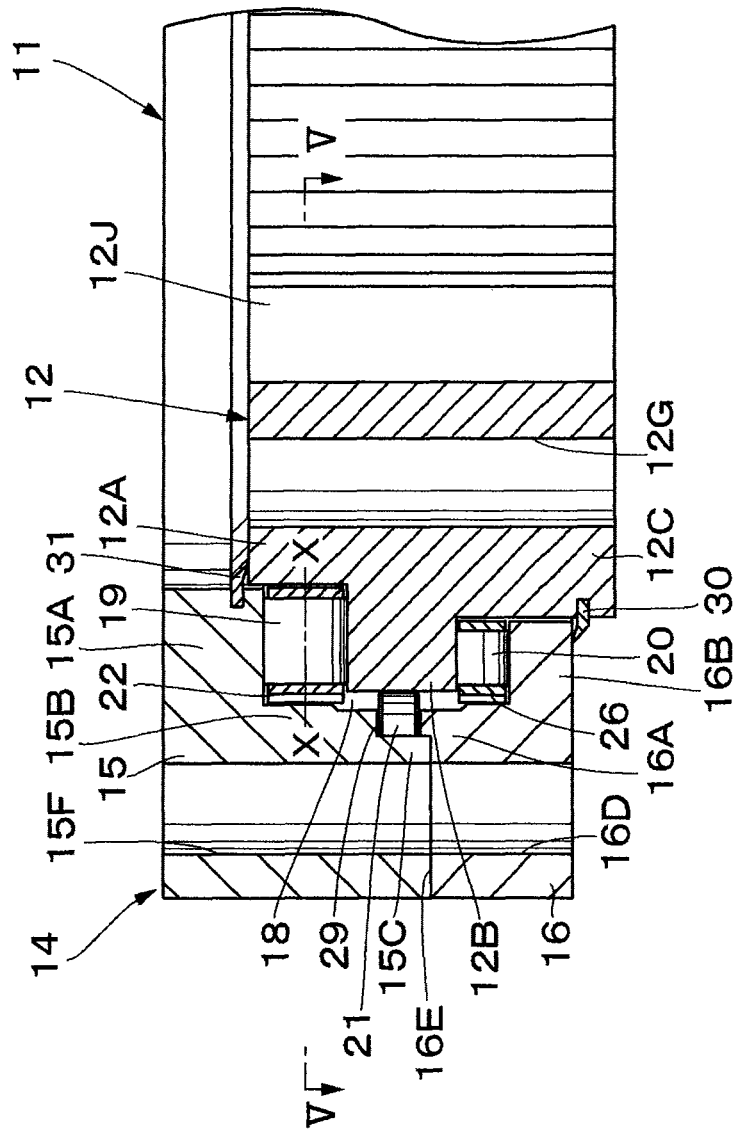
FIG. 3 is an enlarged sectional view corresponding to an arrow (III) part in FIG. 2 illustrating the thrust roller bearing.

As illustrated in FIG. 3, indicated at 12 is an annular inner race fastened to the upper surface of the cylindrical body 5 by using a bolt 13 which will be described later, and the inner race 12 is formed as a three-stepped cylindrical member having an upper cylindrical portion 12A having the smallest outer diameter dimension, an intermediate cylindrical portion 12B having the largest outer diameter dimension, and a lower cylindrical portion 12C having an outer diameter dimension smaller than the intermediate cylindrical portion 12B and larger than the upper cylindrical portion 12A.

Figure 4:
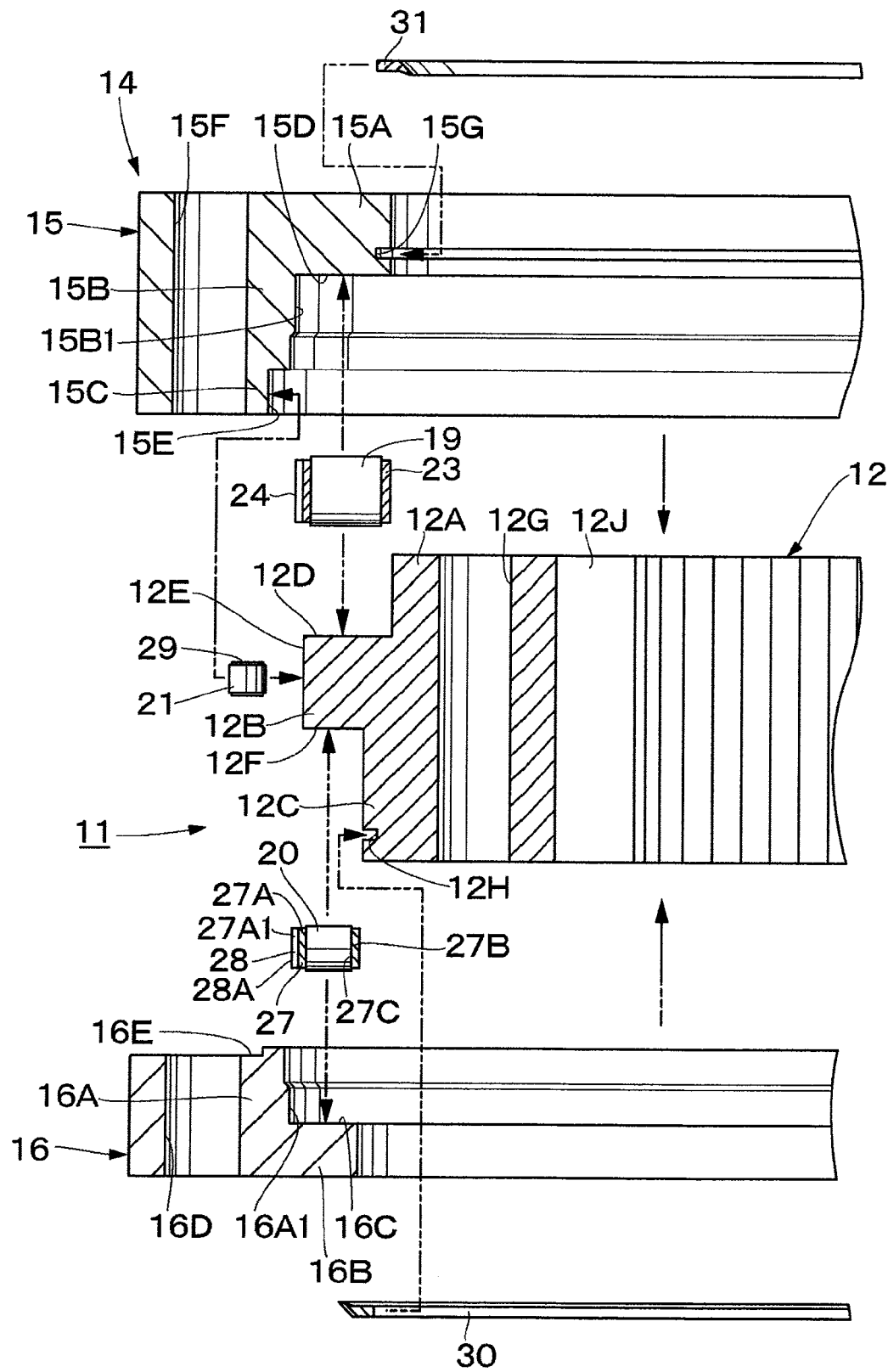
FIG. 4 is an exploded sectional view illustrating the thrust roller bearing when seen from the same direction as FIG. 3.

As illustrated in FIG. 4, a stepped surface continuing between an outer peripheral surface of the upper cylindrical portion 12A and an outer peripheral surface of the intermediate cylindrical portion 12B is an inner race side thrust raceway surface 12D on which the thrust roller 19 which will be described later rolls. The outer peripheral surface of the intermediate cylindrical portion 12B is an inner race side radial raceway surface 12E on which the radial roller 21 which will be described later rolls. A stepped surface continuing between the outer peripheral surface of the intermediate cylindrical portion 12B and an outer peripheral surface of the lower cylindrical portion 12C is an inner race side thrust raceway surface 12F on which the thrust roller 20 which will be described later rolls.

At a plurality of locations in the peripheral direction of the inner race 12, bolt insertion holes 12G through which bolts 13 which will be described later are inserted are provided by being spaced apart from each other in the peripheral direction. In a portion lower than a lower end face of the outer race 14 which will be described later in the outer peripheral surface of the lower cylindrical portion 12C of the inner race 12, a seal groove 12H in which a seal 30 which will be described later is attached is provided over the entire periphery. On the inner periphery side (inner side in the radial direction) of the inner race 12, internal teeth 12J are formed over the entire periphery, and the internal teeth 12J are configured to be meshed with a pinion 32C which will be described later.

The plurality of bolts 13 are for fastening the inner race 12 on the upper surface of the cylindrical body 5, and each bolt 13 is inserted in each bolt insertion hole 12G of the inner race 12 and screwed with the cylindrical body 5.

Indicated at 14 is an annular outer race provided concentrically with the revolving axis O-O of the inner race 12 on the outer periphery side (outer side in the radial direction) of the inner race 12, and the outer race 14 forms an annular roller accommodating space 18 which will be described later between itself and the inner race 12. The outer race 14 is composed of an annular upper outer race split body 15 and an annular lower outer race split body 16 arranged on the lower side of the upper outer race split body 15. The upper outer race split body 15 and the lower outer race split body 16 are abutted each other and fastened on the lower surface of the revolving frame 7 by using a bolt 17 which will be described later so as to constitute the outer race 14.

The upper outer race split body 15 is formed as a three-stepped cylindrical member having an upper cylindrical portion 15A having the smallest inner diameter dimension, an intermediate cylindrical portion 15B having an inner diameter dimension larger than the upper cylindrical portion 15A, and a lower cylindrical portion 15C having an inner diameter dimension larger than the upper cylindrical portion 15A and the intermediate cylindrical portion 15B.

An inner peripheral surface 15B1 of the intermediate cylindrical portion 15B is a stepped inner peripheral surface, and the inner peripheral surface 15B1 is opposed to an outer wall surface 23C1 of the thrust cage 22 which will be described later. The stepped surface between the inner peripheral surface of the upper cylindrical portion 15A and the inner peripheral surface 15B1 of the intermediate cylindrical portion 15B is an outer race side thrust raceway surface 15D on which the thrust roller 19 which will be described later rolls. The inner peripheral surface of the lower cylindrical portion 15C is an outer race side radial raceway surface 15E on which the radial roller 21 which will be described later rolls.

At a plurality of locations in the peripheral direction of the upper outer race split body 15, bolt insertion holes 15F through which bolts 17 which will be described later are inserted are provided by being spaced apart from each other in the peripheral direction. In a portion upper than an upper end face of the inner race 12 in the inner peripheral surface of the upper cylindrical portion 15A of the upper outer race split body 15, a seal groove 15G in which a seal 31 which will be described later is attached is provided over the entire periphery.

On the other hand, the lower outer race split body 16 is formed as a two-stepped cylindrical member having an upper cylindrical portion 16A having a large inner diameter dimension and a lower cylindrical portion 16B having a small inner diameter dimension. An inner peripheral surface 16A1 of the upper cylindrical portion 16A is a stepped inner peripheral surface, and an outer wall surface 27A1 of the thrust cage 26 which will be described later is opposed to the inner peripheral surface 16A1. A stepped surface between the inner peripheral surface 16A1 of the upper cylindrical portion 16A and an inner peripheral surface of the lower cylindrical portion 16B is an outer race side thrust raceway surface 16C on which the thrust roller 20 which will be described later rolls.

At a plurality of locations in the peripheral direction of the lower outer race split body 16, bolt insertion holes 16D through which the bolts 17 which will be described later are inserted are provided in accordance with the bolt insertion holes 15F of the upper outer race split body 15. On the upper surface of the lower outer race split body 16, an engaging recessed portion 16E in which a lower end portion of the lower cylindrical portion 15C of the upper outer race split body 15 is fitted is provided. It is so configured that fitting between the engaging recessed portion 16E and the lower end portion of the lower cylindrical portion 15C positions the lower outer race split body 16 and the upper outer race split body 15 in the radial direction (concentrically).

The plurality of bolts 17 fasten the outer race 14 (the upper outer race split body 15 and the lower outer race split body 16) to the lower surface of the revolving frame 7, and each bolt 17 is inserted through each bolt insertion hole 16D of the lower outer race split body 16 and each bolt insertion hole 15F of the upper outer race split body 15 and screwed with the revolving frame 7.

As illustrated in FIG. 3, the annular roller accommodating space 18 is formed between the inner race 12 and the outer race 14, and the roller accommodating space 18 accommodates the thrust rollers 19 and 20 and the radial roller 21 which will be described later capable of rolling.

Indicated at 19 are a plurality of first thrust rollers (thrust cylindrical rollers) as rollers provided between the inner race side thrust raceway surface 12D and the outer race side thrust raceway surface 15D. Each of the first thrust rollers 19 is to support the inner race 12 and the outer race 14 around the revolving axis 0-0 capable of relative rotation while supporting a thrust load applied between the inner race 12 and the outer race 14.

The first thrust rollers 19 are arranged in the roller accommodating space 18 capable of rolling around a roller center axis X-X perpendicular to the revolving axis 0-0 of the inner race 12 and the outer race 14 and extending in the radial direction. The first thrust rollers 19 are configured to allow relative rotation between the inner race 12 and the outer race 14 by rolling (revolving while rotating) between the inner race side thrust raceway surface 12D and the outer race side thrust raceway surface 15D.

Indicated at 20 are a plurality of second thrust rollers (thrust cylindrical rollers) as rollers provided between the inner race side thrust raceway surface 12F and the outer race side thrust raceway surface 16C. Each of the second thrust rollers 20 is to support the inner race 12 and the outer race 14 capable of relative rotation around the revolving axis O-O while supporting the thrust load applied between the inner race 12 and the outer race 14 similarly to the first thrust rollers 19.

The second thrust rollers 20 are arranged in the roller accommodating space 18 capable of rolling around the roller center axis X-X (See FIG. 2) perpendicular to the revolving axis O-O of the inner race 12 and the outer race 14 and extending in the radial direction similarly to the first thrust rollers 19. Each of the second thrust rollers 20 is configured to allow relative rotation between the inner race 12 and the outer race 14 by rolling (revolving while rotating) between the inner race side thrust raceway surface 12F and the outer race side thrust raceway surface 16C.

The plurality of radial rollers (radial cylindrical rollers) 21 are provided between the inner race side radial raceway surface 12E and the outer race side radial raceway surface 15E. Each of these radial rollers 21 is to support the inner race 12 and the outer race 14 capable of relative rotation around the revolving axis O-O while supporting a radial load applied between the inner race 12 and the outer race 14. The radial rollers 21 are arranged in the roller accommodating space 18 capable of rolling around a roller center axis (not shown) in parallel with the revolving axis O-O of the inner race 12 and the outer race 14. The radial rollers 21 are configured to allow relative rotation between the inner race 12 and the outer race 14 by rolling (revolving while rotating) between the inner race side radial raceway surface 12E and the outer race side radial raceway surface 15E.

Subsequently, the thrust cage 22 for retaining the first thrust rollers 19, the thrust cage 26 for retaining the second thrust rollers 20, the radial cage 29 for retaining the radial rollers 21 and the like will be described.

Figure 5:
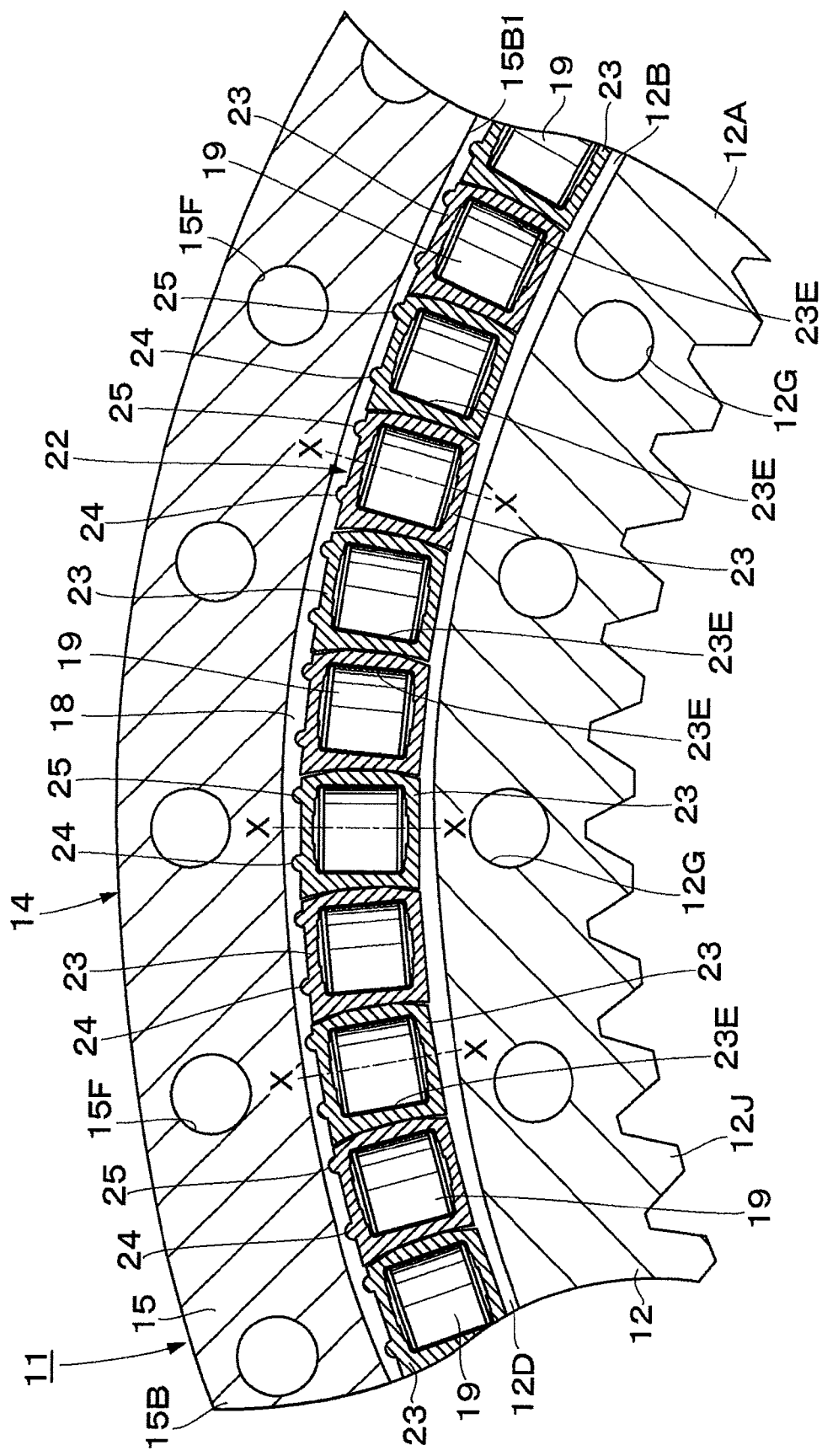
FIG. 5 is a sectional view illustrating the thrust roller bearing when seen from an arrow V-V direction in FIG. 3.

That is, designated at 22 is the thrust cage as a cage provided in the roller accommodating space 18 for retaining the first thrust rollers 19 capable of rolling. As illustrated in FIG. 5 and the like, the thrust cage 22 is composed of a plurality of cage separate bodies 23 separated and arranged in the roller accommodating space 18 over the entire periphery of the roller accommodating space 18.

Figure 6:
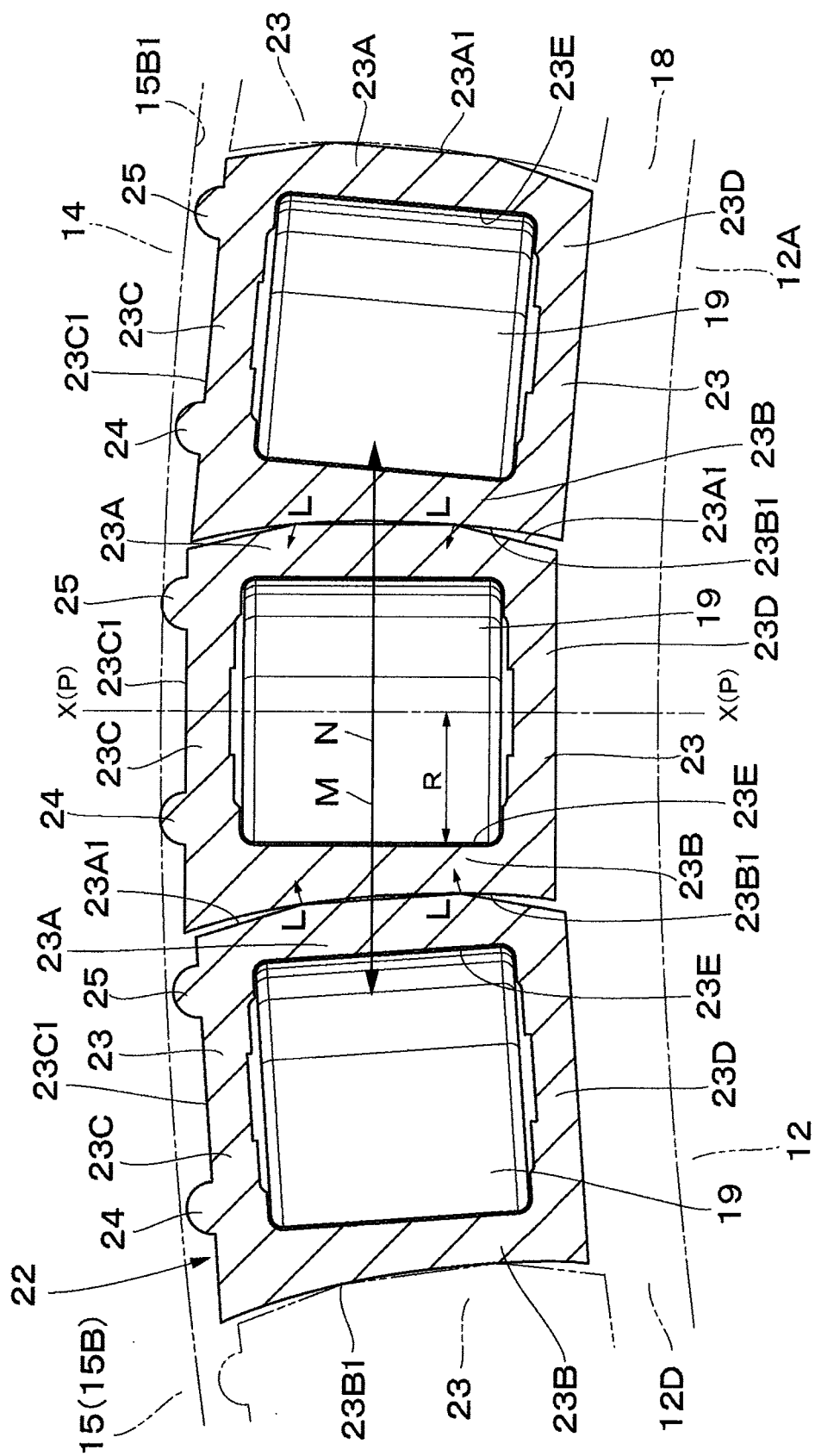
FIG. 6 is an enlarged sectional view illustrating a cage separate body, a roller and the like in FIG. 5 in an enlarged manner.
Figure 7:
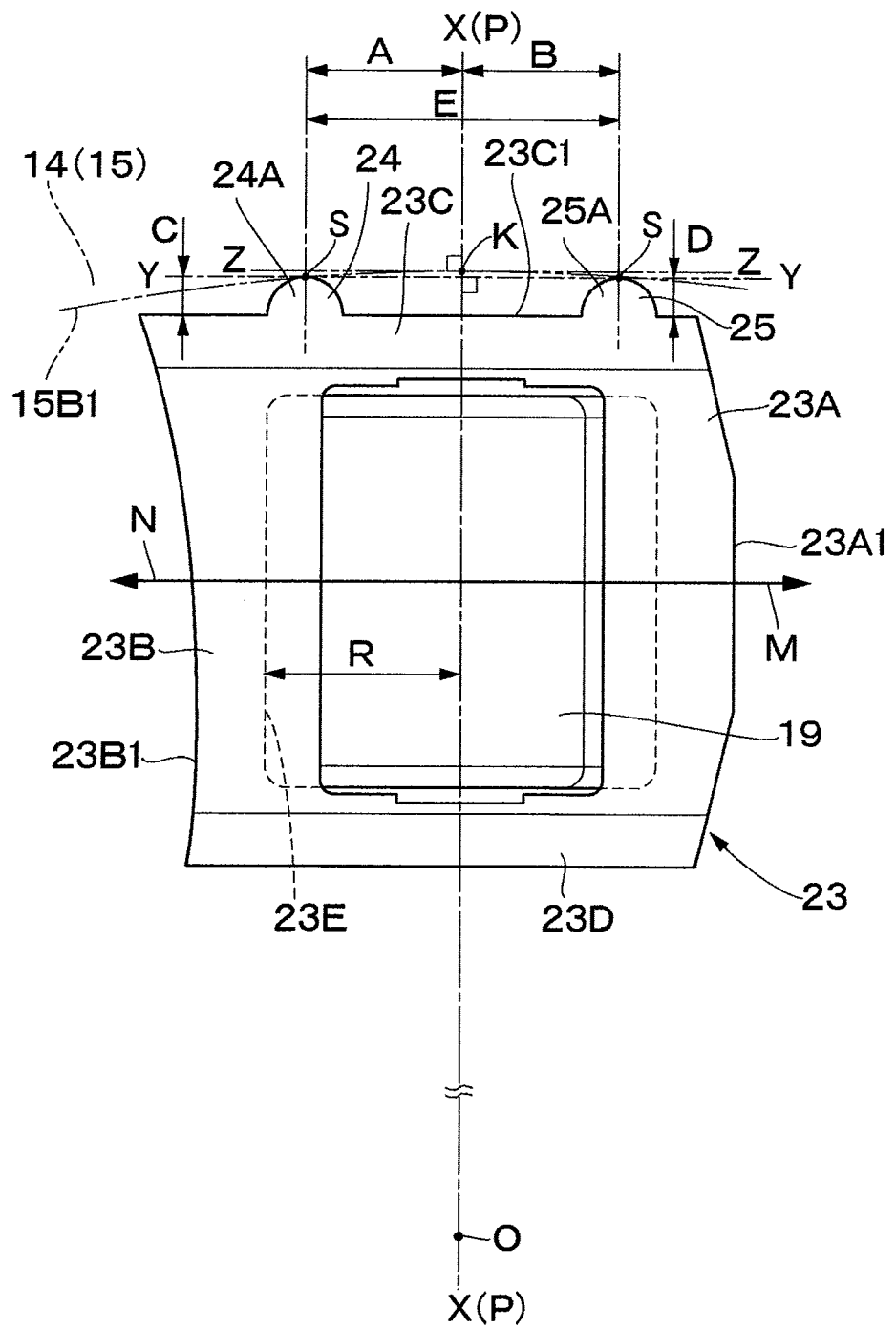
Figure 8:
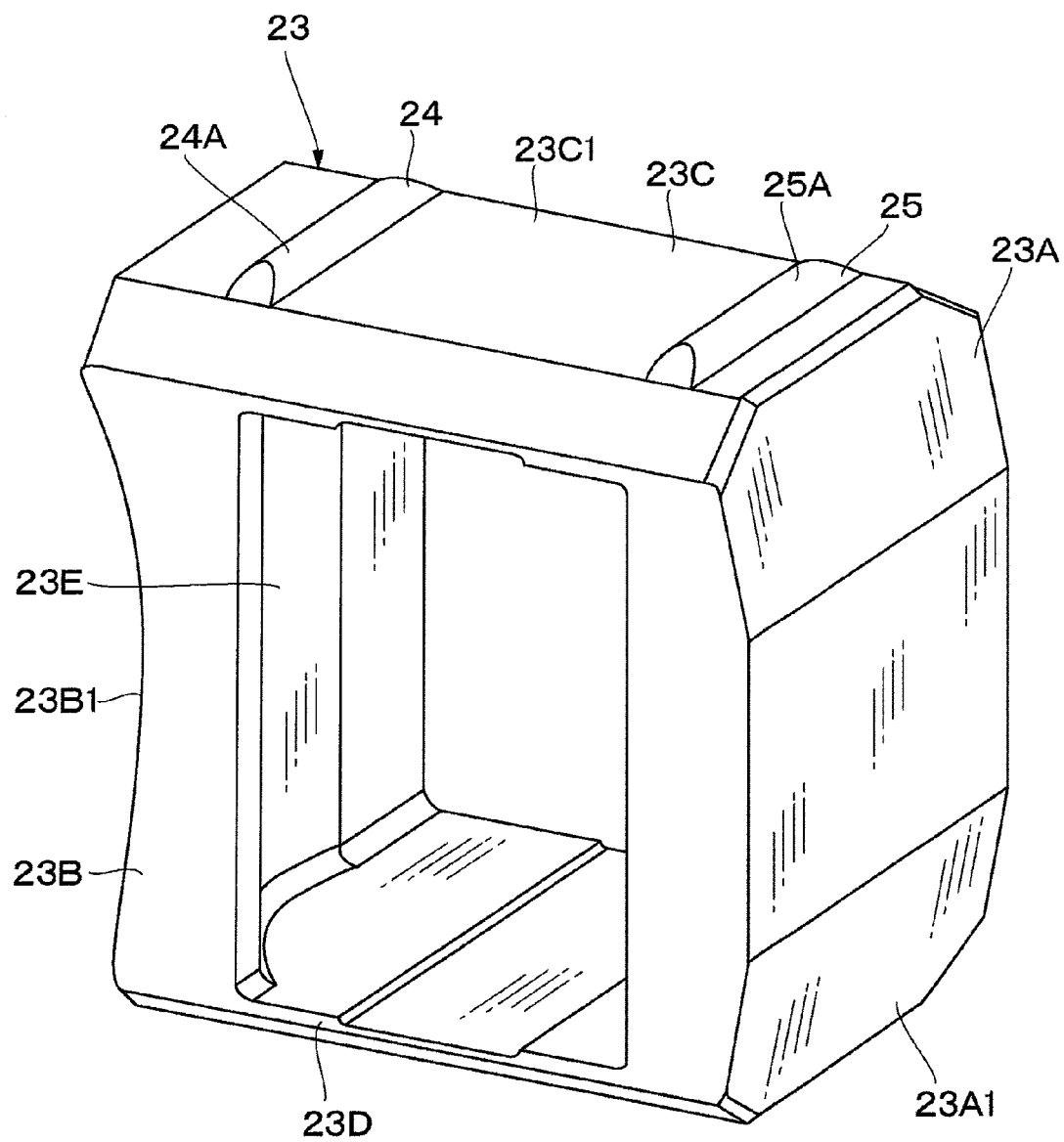
FIG. 8 is a perspective view illustrating the cage separate body as a single body.

As illustrated in FIGS. 6, 7 and the like, each cage separate body 23 is composed of projected partition portions (columnar portions) 23A and recessed partition portions (columnar portions) 23B opposed to each other sandwiching the roller center axis X-X, an outside connecting portion 23C connecting end portions on the outer side in the radial direction of each of the partition portions 23A and 23B, an inside connecting portion 23D connecting end portions on the inner side in the radial direction of each of the partition portions 23A and 23B, and a pocket 23E formed by being surrounded by each of the partition portions 23A and 23B, the outside connecting portion 23C, and the inside connecting portion 23D and retaining the thrust roller 19 capable of rolling.

A wall surface of the projected partition portion 23A is a projected surface 23A1 having a polygonal surface shape projected toward another cage separate body 23 adjacent to the partition portion 23A. On the other hand, a wall surface of the recessed partition portion 23B is a concave arc shape surface 23B1 concaved in a direction away from another cage separate body 23 adjacent to the partition portion 23B. As a result, in a state where each cage separate body 23 is provided in a row annularly in the roller accommodating space 18, the projected surface 23A1 of the projected partition portion 23A and the concave arc shape surface 23B1 of the recessed partition portion 23B are brought into contact with each other.

Indicated at 24 and 25 are two projecting portions provided on the outer wall surface 23C1 of the outside connecting portion 23C. These projecting portions 24 and 25 are formed of projecting bodies, each having a semicircular cross-sectional shape, each extending in the revolving axis O-O direction and are provided spaced apart from each other in the peripheral direction of the outer race 14. The projecting portions 24 and 25 project toward the inner peripheral surface 15B1 side of the intermediate cylindrical portion 15B constituting the outer race 14 (upper outer race split body 15).

As a result, as illustrated in FIGS. 6 and 7, with relative rotation between the inner race 12 and the outer race 14, when each cage separate body 23 moves in the peripheral direction in the roller accommodating space 18 and is also displaced toward the inner peripheral surface 15B1 side of the outer race 14, the top portions 24A and 25A of each of the projecting portions 24 and 25 are configured to be brought into contact with (sliding) the inner peripheral surface 15B1 of the outer race 14.

As illustrated in FIG. 7, when the top portions 24A and 25A of each of the projecting portions 24 and 25 are brought into contact with the inner peripheral surface 15B1 of the outer race 14, assuming that an intersection between the roller center axis X-X and the inner peripheral surface 15B1 of the outer race 14 is K, a tangent Z-Z with the inner peripheral surface 15B1 at the intersection K is configured to be perpendicular to the roller center axis X-X. In other words, as illustrated in FIG. 6, a center axis P-P of the pocket 23E of the cage separate body 23 is configured to be perpendicular to a rolling direction M of the thrust roller 19.

Therefore, as illustrated in FIG. 7, if the top portions 24A and 25A of each of the projecting portions 24 and 25 are brought into contact with the inner peripheral surface 15B1 of the outer race 14, a virtual line Y-Y connecting contact points S between the inner peripheral surface 15B1 of the outer race 14 and each of the projecting portions 24 and 25 is configured to be perpendicular to the roller center axis X-X and the center axis P-P of the pocket 23E of the cage separate body 23.

The dimension and a positional relationship of each of the projecting portions 24 and 25 are set as follows. That is, as illustrated in FIG. 7, assuming that a distance dimension between one projecting portion 24 of each of the projecting portions 24 and 25 and the roller center axis X-X is A and a distance dimension between the other projecting portion 25 of each of the projecting portions 24 and 25 and the roller center axis X-X is B, the distance dimensions A and B have the relationship expressed in the following formula 1. At the same time, assuming a height dimension of the one projecting portion 24 is C and a height dimension of the other projecting portion 25 is D, the height dimensions C and D have the relationship expressed in the following formula 1.

$$A=B$$

$$C=D \quad \text{[Formula 1]}$$

As a result, as illustrated in FIG. 6, when the top portions 24A and 25A of each of the projecting portions 24 and 25 are brought into contact with the inner peripheral surface 15B1 of the outer race 14, the rolling direction M of the thrust roller 19 and a moving direction N of the cage separate body 23 can be made to match each other, and misalignment between each thrust roller 19 and each cage separate body 23 can be prevented.

Regarding the distance dimension A of the one projecting portion 24 and the distance dimension B of the other projecting portion 25, assuming a radius of the thrust roller 19 is R, the distance dimensions A and B and the radius R are set as expressed in the following formula 2.

$$0.6R \leq A=B \leq R \text{ (more preferably, } 0.7R \leq A=B \leq 0.9R\text{)} \quad \text{[Formula 2]}$$

As a result, a distance E (=A+B) between the contact points S between the inner peripheral surface 15B1 of the outer race 14 and each of the projecting portions 24 and 25 can be made appropriate. That is, in a state where the rolling direction M of the thrust roller 19 and the moving direction N of the cage separate body 23 are made to match each other, the inner peripheral surface 15B1 of the outer race 14 and each of the projecting portions 24 and 25 can be brought into contact with each other stably.

Indicated at 26 is a thrust cage as a cage provided in the roller accommodating space 18 for retaining the second thrust roller 20 capable of rolling. The thrust cage 26 is composed of a plurality of cage separate bodies 27 separated and arranged in the roller accommodating space 18 over the entire periphery of the roller accommodating space 18 similarly to the thrust cage 22.

As illustrated in FIG. 4 and the like, each of these cage separate bodies 27 is composed of a projected partition portion and a recessed partition portion (either of them is not shown) opposed to each other sandwiching the roller center axis X-X, an outside connecting portion 27A connecting end portions on the outer side in the radial direction of each of the partition portions, an inside connecting portion 27B connecting end portions on the inner side in the radial direction of each of the partition portions, and a pocket 27C formed by being surrounded by each partition portion, the outside connecting portion 27A, and the inside connecting portion 27B and retaining the thrust roller 20 capable of rolling similarly to each of the cage separate bodies 23.

Each of the cage separate bodies 27 also has two projecting portions 28 (only one of them is shown) projecting toward the inner peripheral surface 16A1 of the upper cylindrical portion 16A constituting the outer race 14 (lower outer race split body 16) at the position on the outer wall surface 27A1 of the outside connecting portion 27A. As a result, with relative rotation between the inner race 12 and the outer race 14, when each cage separate body 27 moves in the peripheral direction in the roller accommodating space 18 and is also displaced toward the inner peripheral surface 16A1 side of the outer race 14, top portions 28A of each of the projecting portions 28 are configured to be brought into contact with (sliding) the inner peripheral surface is 16A1 of the outer race 14.

It should be noted that since each of the cage separate bodies 27 constituting the thrust cage 26 has the same configuration and operational effects as those of the cage separate bodies 23 constituting the above-described thrust cage 22, further explanation of the thrust cage 26 (each cage separate body 27) will be omitted.

Moreover, the radial cage 29 is provided in the roller accommodating space 18 in order to retain the radial roller 21 capable of rolling, and the radial cage 29 retains each of the radial rollers 21 at predetermined intervals in the peripheral direction of the inner race 12 and the outer race 14.

On the other hand, as illustrated in FIG. 3, a pair of seals 30 and 31 are provided between the inner race 12 and the outer race 14. Each of the seals 30 and 31 is formed annularly from an elastic material such as a rubber material, a flexible resin material or the like and is attached to the seal groove 12H of the inner race 12 and the seal groove 15G of the outer race 14, respectively. Each of these seals 30 and 31 prevents entry of foreign objects from the outside into the roller accommodating space 18 and also prevents leakage of a lubricant (grease) in the roller accommodating space 18 to the outside.

As illustrated in FIG. 2, two units of the revolving drive devices 32 are fixed to the revolving frame 7 by using a bolt or the like, and each of the revolving drive devices 32 revolves the revolving frame 7 on the cylindrical body 5 by transmitting a large rotational force to the inner race 12 of the revolving bearing 11. Each of the revolving drive devices 32 is composed of a hydraulic motor 32A as a rotating source, a planetary gear reduction device 32B constituted by a sun gear, a planetary gear, a carrier and the like (none of them is shown) for reducing the speed of rotation of the hydraulic motor 32A and a pinion 32C for outputting the rotation whose speed was reduced by the planetary gear reduction device 32B. The pinion 32C is meshed with the internal teeth 12J of the inner race 12 constituting the revolving bearing 11.

Each of the revolving drive devices 32 is to rotate the pinion 32C meshed with the internal teeth 12J of the inner race 12 with a large torque (rotational force) by reducing the speed of the rotation of the hydraulic motor 32A by the planetary gear reduction device 32B. As a result, the pinion 32C is configured to revolve while rotating along the internal teeth 12J of the inner race 12 and revolves the revolving frame 7 (upper revolving structure 6) on the cylindrical body 5 (lower traveling structure 2) by a revolving force at this time.

A grease bath 33 is arranged on the inner periphery side of the cylindrical body 5. This grease bath 33 is attached to the lower surface of the inner race 12 constituting the revolving bearing 11 by using a stud bolt and a nut (either of them is not shown), for example. The grease bath 33 is to store grease (lubricant oil) for lubricating the meshed portion between the pinion 32C of the revolving drive device 32 and the internal teeth 12J of the inner race 12.

The hydraulic excavator 1 according to the first embodiment has the above-described configuration, and the hydraulic excavator 1 runs to a work site by the lower traveling structure 2 and then, performs an excavating work of earth and sand or the like by using a working mechanism (not shown) while revolving the upper revolving structure 6 by the revolving device 10.

In case the upper revolving structure 6 is to be revolved on the lower traveling structure 2, the hydraulic motor 32A of the revolving drive device 32 is rotated and driven, and a speed of rotation of this hydraulic motor 32A is reduced by the planetary gear reduction device 32B so that the pinion 32C meshed with the internal teeth 12J of the inner race 12 constituting the revolving bearing 11 is rotated with a large torque. As a result, the pinion 32C revolves while rotating along the internal teeth 12J of the inner race 12, and the revolving force of the pinion 32C is transmitted to the revolving frame 7 to which the revolving drive device 32 is fixed. As a result, the revolving frame 7 revolves on the cylindrical body 5 through the revolving bearing 11 and can revolve the upper revolving structure 6 on the lower traveling structure 2.

At this time, the cage separate bodies 23 constituting the thrust cage 22 of the revolving bearing 11 move together with the first thrust rollers 19 in the peripheral direction in the roller accommodating space 18 with relative rotation between the inner race 12 and the outer race 14. That is, as illustrated in FIG. 6, the first thrust roller 19 of the revolving bearing 11 rolls in an arrow M direction in the annular roller accommodating space 18 with relative rotation between the inner race 12 and the outer race 14. The cage separate body 23 retaining (accommodating) the thrust roller 19 in the pocket 23E capable of rolling also moves in an arrow N direction with the rolling of the thrust roller 19.

In this case, in a load range where a thrust load acts on the first thrust roller 19, the thrust roller 19 is rotated and driven on the basis of relative rotation between the inner race 12 and the outer race 14, and the cage separate body 23 also moves by being pressed by the thrust roller 19 on the basis of the rotation of the thrust roller 19. On the other hand, in a non-load range where the thrust load does not act on the first thrust roller 19, since the thrust roller 19 does not have a driving force, the cage separate body 23 in the non-load range is pressed by the cage separate body 23 in the load range, and the thrust roller 19 held by the cage separate body 23 rolls with that.

It should be noted that in the case of the revolving bearing 11 of the hydraulic excavator 1, if earth and sand or the like are to be lifted up by a bucket of the working mechanism (none of them is shown), for example, a semicircle part located on the side opposite to the working mechanism sandwiching the revolving axis O-O in the revolving bearing 11 becomes the non-load range, while the semicircle part located on the working mechanism side becomes the load range. On the other hand, when the working mechanism is pressed by the ground such as a moment when the bucket of the working mechanism touches the ground or the like, for example, the semicircle part located on the side opposite to the working mechanism sandwiching the revolving axis O-O in the revolving bearing 11 becomes the load range, while the semicircle part located on the working mechanism side becomes the non-load range.

In any case, when the upper revolving structure 6 is revolving (during relative rotation between the inner race 12 and the outer race 14), the cage separate body 23 is pressed by each thrust roller 19 when passing through the load range and is pressed by the cage separate body 23 passing through the load-range when passing through the non-load range. Therefore, the cage separate body 23 moves in the peripheral direction in the roller accommodating space 18 while pressing the cage separate bodies 23 with each other adjacent in the rolling direction of the thrust roller 19.

At this time, to the cage separate body 23, a force indicated by an arrow L in FIG. 6 is applied from the adjacent cage separate bodies 23, and the cage separate body 23 moves in the peripheral direction in the roller accommodating space 18 while being pressed onto the inner peripheral surface 15B1 of the outer race 14. That is, the cage separate body 23 receives a force L in a direction to be pressed onto the inner peripheral surface 15B1 side of the outer race 14 from the adjacent cage separate bodies 23. As a result, the cage separate body 23 is displaced also toward the inner peripheral surface 15B1 side of the outer race 14 while moving in the peripheral direction in the roller accommodating space 18.

According to the first embodiment, the two projecting portions 24 and 25 are provided on the outer wall surface 23C1 of the cage separate body 23. Therefore, when the cage separate body 23 is displaced toward the inner peripheral surface 15B1 side of the outer race 14 (when being pressed onto the inner peripheral surface 15B1 of the outer race 14), each of the projecting portions 24 and 25 of the cage separate body 23 is brought into contact with (sliding) the inner peripheral surface 15B1 of the outer race 14.

In this case, as illustrated in FIG. 7, the distance dimension A of the one projecting portion 24 and the distance dimension B of the other projecting portion 25 are made equal to each other, and the height dimension C of the one projecting portion 24 and the height dimension D of the other projecting portion 25 are set equal in configuration. Thus, the virtual line Y-Y connecting the contact points S between the inner peripheral surface 15B1 of the outer race 14 and each of the projecting portions 24 and 25 is perpendicular to the roller center axis X-X. In other words, the center axis P-P of the pocket 23E of the cage separate body 23 is perpendicular to the rolling direction M of the thrust roller 19.

Thus, when the top portions 24A and 25A of each of the projecting portions 24 and 25 are brought into contact with the inner peripheral surface 15B1 of the outer race 14, the rolling direction M of the thrust roller 19 matches the moving direction N of the cage separate body 23. Therefore, misalignment between the thrust roller 19 (the center axis X-X thereof) and the cage separate body 23 (the center axis P-P of the pocket 23E thereof) can be prevented, and abnormal wear and damage on the inner surface of the pocket 23E of the cage separate body 23 can be prevented.

As a result, durability and reliability of the revolving bearing 11 can be improved.

Subsequently, comparison between the cage separate body 23 according to the first embodiment illustrated in FIG. 6 and a cage separate body 100 according to a comparative example illustrated in FIG. 9 will be described.

Figure 9:
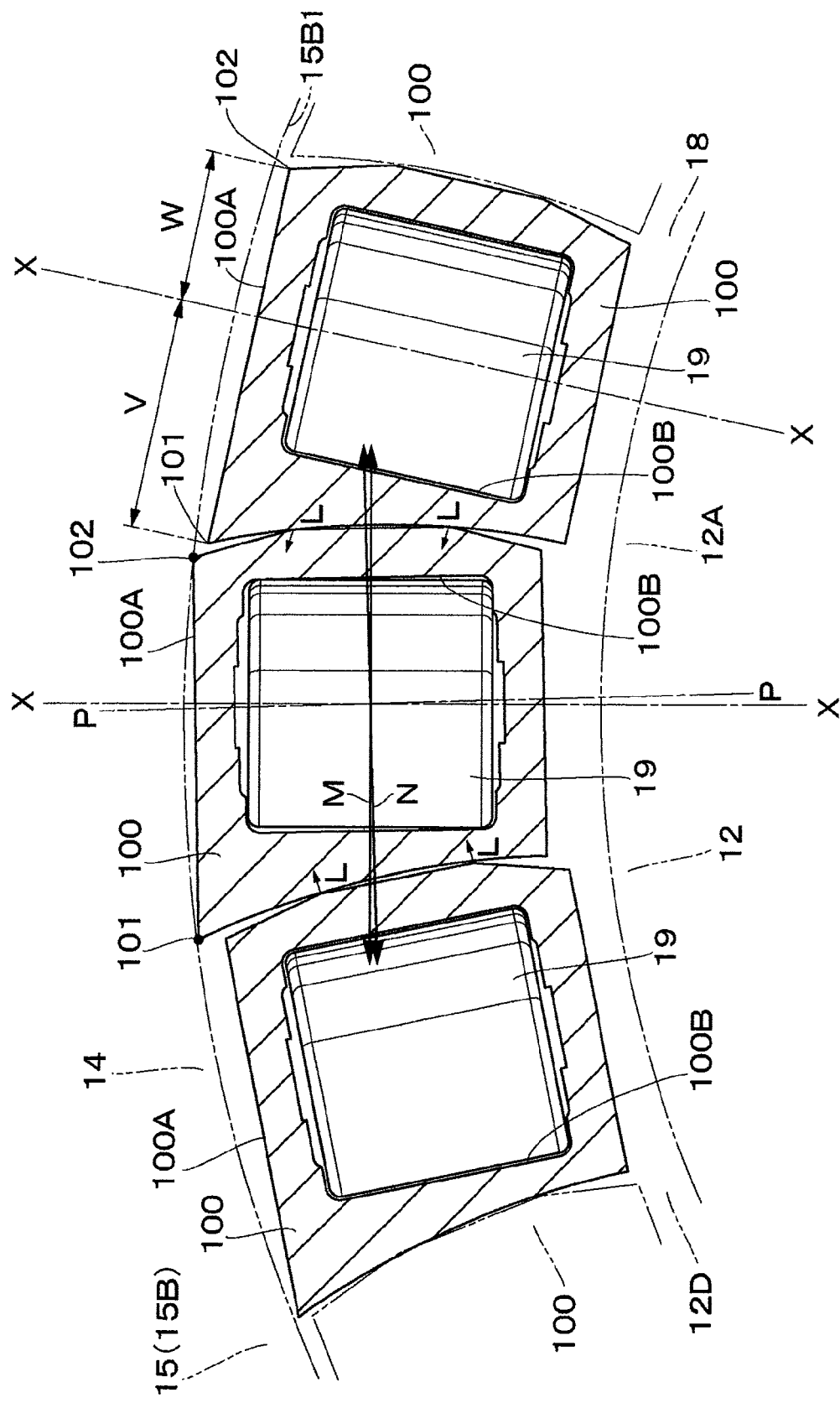
FIG. 9 is an enlarged sectional view illustrating the cage separate body, the roller and the like according to a comparative example similar to FIG. 6.

FIG. 9 illustrates the cage separate body 100 according to the comparative example. Regarding the cage separate body 100 according to the comparative example, a distance dimension V between an end edge portion 101 on one side in the peripheral direction in an outer wall surface 100A and the roller center axis X-X and a distance dimension W between an end edge portion 102 on the other side in the peripheral direction in the outer wall surface 100A and the roller center axis X-X are different in the configuration. The cage separate body 100 according to the comparative example does not have the projecting portions 24 and 25 as in the first embodiment.

In the case of such comparative example, if the cage separate body 100 is displaced toward the inner peripheral surface 15B1 side of the outer race 14 (if being pressed onto the inner peripheral surface 15B1 of the outer race 14), the both end edge portions 101 and 102 of the outer wall surface 100A of the cage separate body 100 are brought into contact with the inner peripheral surface 15B1 of the outer race 14, and with this contact, the moving direction N of the cage separate body 100 does not match the rolling direction M of the thrust roller 19 anymore. As a result, the center axis P-P of a pocket 100B of the cage separate body 100 becomes misaligned with respect to the roller center axis X-X of the thrust roller 19, and it is concerned that the inner surface of the pocket 100B of the cage separate body 100 is subjected to abnormal wear or damage easily.

In order to prevent such misalignment, the distance dimensions V and W of the cage separate body 100 maybe set equal.

However, in this case, the dimension V cannot be made small in order to ensure the pocket 100B, and the dimension W should be made large, and the dimension of the cage separate body 100 with respect to the peripheral directions of the inner race 12 and the outer race 14 becomes large. Therefore, the intervals between each of the adjacent thrust rollers 19 in the peripheral direction increase, the number of thrust rollers 19 which can be incorporated in the revolving bearing 11 decreases, and a load capacity of the revolving bearing 11 becomes small.

On the other hand, according to the first embodiment, since each of the projecting portions 24 and 25 is configured to project toward the inner peripheral surface 15B1 of the outer race 14 from the outer wall surface 23C1 of the cage separate body 23, misalignment can be prevented as described above without increasing the dimension of the cage separate body 23 with respect to the peripheral directions of the inner race 12 and the outer race 14. In other words, by providing the two projecting portions 24 and 25 on the outer wall surface 23C1 of the cage separate body 23, misalignment can be prevented without decreasing the number of thrust rollers 19 incorporated in the revolving bearing 11. As a result, ensuring of the load capacity of the revolving bearing 11 and prevention of misalignment can be both realized.

According to the first embodiment, as illustrated in FIG. 7, the distance dimension A between one projecting portion 24 and the roller center axis X-X and the distance dimension B between the other projecting portion 25 and the roller center axis X-X are set at 0.6 times or more and 1 time or less (more preferably 0.7 times or more and 0.9 times or less) of the radius R of the thrust roller 19. Thus, the distance E between the contact point S between the inner peripheral surface 15B1 of the outer race 14 and the one projecting portion 24 and the contact point S between the inner peripheral surface 15B1 and the other projecting portion 25 can be made appropriate. As a result, when the top portions 24A and 25A of each of the projecting portions 24 and 25 are brought into contact with the inner peripheral surface 15B1 of the outer race 14, the state where the rolling direction M of the thrust roller 19 and the moving direction N of the cage separate body 23 are matched each other can be maintained stably.

According to the first embodiment, a final assembling gap of the revolving bearing 11 can be also set in a state where each of the projecting portions 24 and 25 of all the cage separate bodies 23 is in contact with the inner peripheral surface 15B1 of the outer race 14. That is, the final assembling gap is a final gap in the peripheral direction generated between the first assembled cage separate body 23 and the last assembled cage separate body 23 if each thrust roller 19 and the cage separate bodies 23 are assembled in the roller accommodating space 18 so that no gap is generated in the peripheral direction between the adjacent cage separate bodies 23 over the entire periphery and a dimensional tolerance of each cage separate body 23 is absorbed.

In case such final assembling gap is set in a state where each of the projecting portions 24 and 25 of all the cage separate bodies 23 is in contact with the inner peripheral surface 15B1 of the outer race 14, a difference is made to hardly occur between the final assembling gap on design acquired by calculation and the actual final assembling gap when each thrust roller 19 and each cage separate body 23 are assembled in the roller accommodating space 18 during assembling of the revolving bearing 11. As a result, the final assembling gap can be set smaller, and the number of the thrust rollers 19 which can be incorporated into the revolving bearing 11 can be increased by that portion, and the load capacity of the revolving bearing 11 can be improved.

According to the first embodiment, by providing each of the projecting portions 24 and 25 on the cage separate body 23, a free space can be increased in the roller accommodating space 18, and the amounts of lubricant oil or grease which can be sealed in the roller accommodating space 18 can be increased by that portion. For example, a portion sandwiched by each of the projecting portions 24 and 25 in the outer wall surface 23C1 of the cage separate body 23 can be made to function as a lubricant oil passage through which the lubricant oil or grease flows in the vertical direction. Thus, the lubricant oil or grease can be made to circulate more easily, and durability and reliability of the revolving bearing 11 can be also enhanced from this aspect.

Figure 10:
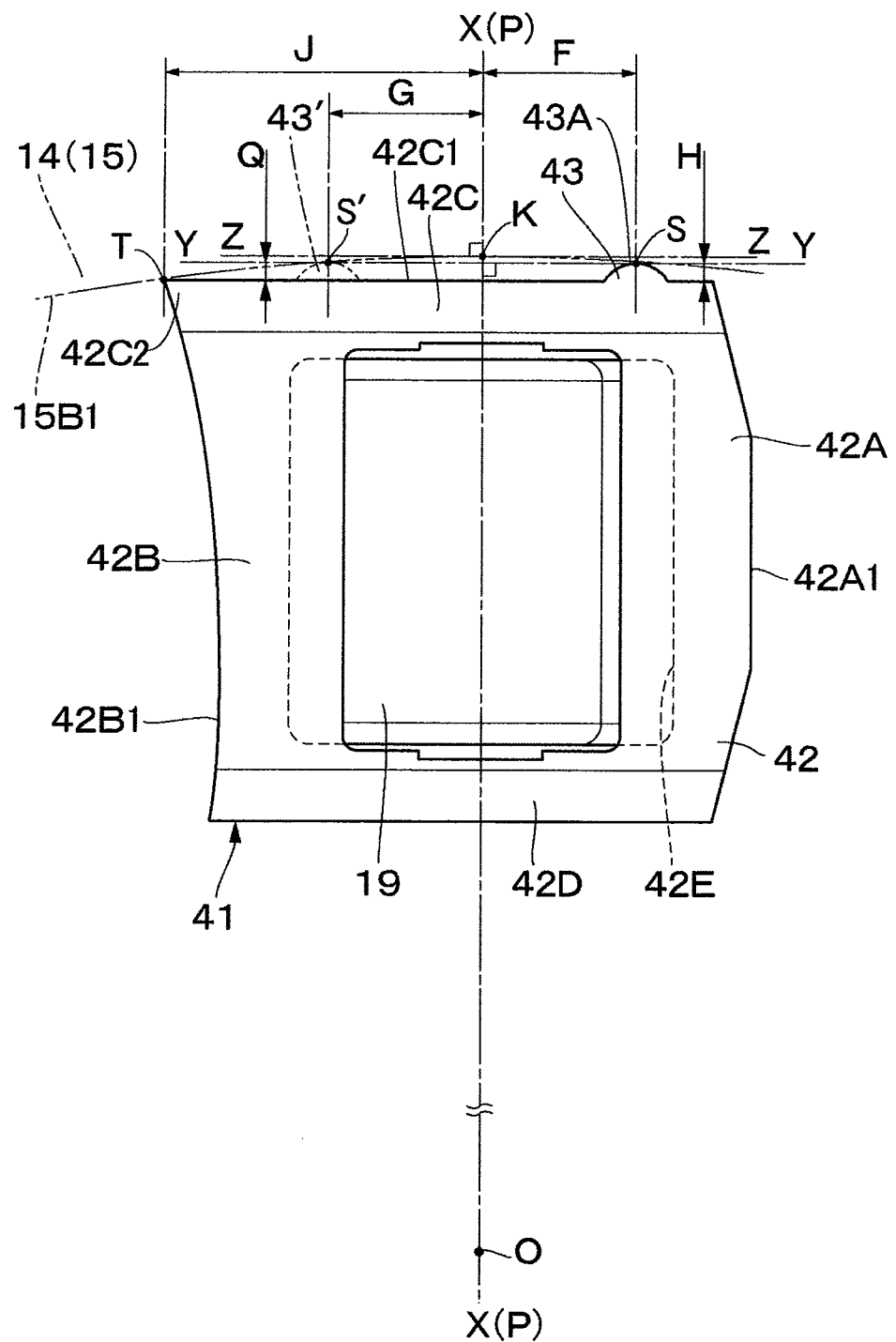
FIG. 10 is a plan view illustrating a cage separate body, a roller and the like according to a second embodiment of the present invention similar to FIG. 7.
Figure 11:
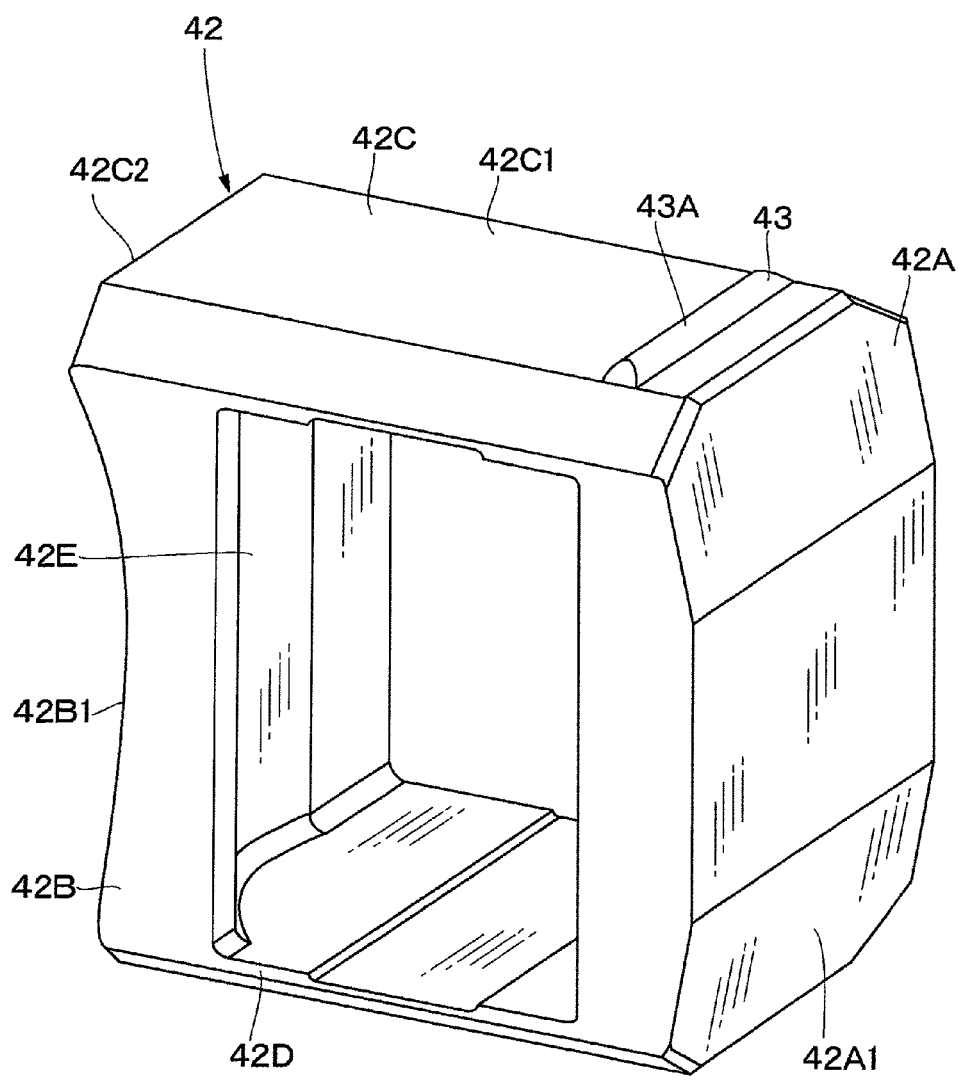
FIG. 11 is a perspective view illustrating a cage separate body according to the second embodiment as a single body.

Next, FIGS. 10 and 11 illustrate a second embodiment of the present invention. A characteristic of the second embodiment is configured that one projecting portion is provided on the outer wall surface of the cage separate body. In the second embodiment, the component elements that are identical to those of the foregoing first embodiment will be simply denoted by the same reference numerals to avoid repetitions of similar explanations.

In the figures, designated at 41 is a thrust cage as a cage provided in the roller accommodating space 18 for retaining the thrust roller 19 capable of rolling, and the thrust cage 41 is composed of a plurality of cage separate bodies 42 separated and arranged in the roller accommodating space 18 over the entire periphery of the roller accommodating space 18 similarly to the above-described first embodiment.

Each of these cage separate bodies 42 is composed of a projected partition portion (columnar portion) 42A and a recessed partition portion (columnar portion) 42B opposed to each other sandwiching the roller center axis X-X, an outside connecting portion 42C connecting end portions on the outer side in the radial direction of each of the partition portions 42A and 42B, an inside connecting portion 42D connecting end portions on the inner side in the radial direction of each of the partition portions 42A and 42B, and a pocket 42E formed by being surrounded by each of the partition portions 42A and 42B, the outside connecting portion 42C and the inside connecting portion 42D and retaining the thrust roller 19 capable of rolling.

A wall surface of the projected partition portion 42A is a projected surface 42A1 having a polygonal surface shape projected toward another cage separate body (not shown) adjacent to the partition portion 42A, and a wall surface of the recessed partition portion 42B is a concave arc shape surface 42B1 concaved in a direction away from another cage separate body (not shown) adjacent to the partition portion 42B. Thereby, in a state where each cage separate body 42 is provided in a row annularly in the roller accommodating space 18, the projected surface 42A1 of the projected partition portion 42A and the concave arc shape surface 42B1 of the recessed partition portion 42B are brought into contact with each other.

Designated at 43 is one projecting portion provided on an outer wall surface 42C1 of the outside connecting portion 42C. The projecting portion 43 is formed of a projecting body having a semicircular cross-sectional shape and extending in the revolving axis O-O direction and is provided at a position spaced apart with respect to the roller center axis X-X in the peripheral direction of the outer race 14.

As a result, with relative rotation between the inner race 12 and the outer race 14, when each cage separate body 42 moves in the peripheral direction in the roller accommodating space 18 and is displaced also toward the inner peripheral surface 15B1 side of the outer race 14, an end edge portion 42C2 on the side opposite to the projecting portion 43 sandwiching the roller center axis X-X in the outer wall surface 42C1 and a top portion 43A of the projecting portion 43 are configured to be brought into contact with (sliding) the inner peripheral surface 15B1 of the outer race 14. That is, in the case of the second embodiment, each of the cage separate bodies 42 is configured to be in contact with the inner peripheral surface 15B1 of the outer race 14 at two locations, namely, the contact point S with the projecting portion 43 and a contact point T with the end edge portion 42C2.

Assuming that an intersection between the roller center axis X-X and the inner peripheral surface 15B1 of the outer race 14 is K when the top portion 43A of the projecting portion 43 and the end edge portion 42C2 of the outer wall surface 42C1 are brought into contact with the inner peripheral surface 15B of the outer race 14, it is configured such that the tangent Z-Z with the inner peripheral surface 15B1 at the intersection K is perpendicular to the roller center axis X-X and the center axis P-P of the pocket 42E of the cage separate body 42. In other words, when the top portion 43A of the projecting portion 43 and the end edge portion 42C2 are brought into contact with the inner peripheral surface 15B1 of the outer race 14, the center axis P-P of the pocket 42E of the cage separate body 42 and the rolling direction of the thrust roller 19 are perpendicular to each other.

Thus, in the case that assuming a virtual projecting portion 43' is provided on the side opposite to the projecting portion 43 sandwiching the roller center axis X-X in the outer wall surface 42C1 symmetrically to the projecting portion 43, it is configured such that the virtual line Y-Y connecting the contact point S between the inner peripheral surface 15B1 of the outer race 14 and the projecting portion 43 and a contact point S' between the inner peripheral surface 15B1 and the virtual projecting portion 43' is perpendicular to the roller center axis X-X.

Here, a specific dimensional relationship of each portion is set as follows. That is, assuming a distance dimension between the projecting portion 43 and the roller center axis X-X is F, a distance dimension between the virtual projecting portion 43' and the roller center axis X-X is G, a height of the projecting portion 43 is H, and a height of the virtual projecting portion 43' is Q, and a distance dimension between the end edge portion 42C2 of the outer wall surface 42C1 and the roller center axis X-X is J, the distance dimensions F, G, and J and the height dimensions H and Q have a relationship of the following formula 3.

$$F=G$$

$$F<J$$

$$H=Q \hspace{2cm} \text{[Formula 3]}$$

As a result, when the top portion 43A of the projecting portion 43 and the end edge portion 42C2 of the outer wall surface 42C1 are brought into contact with the inner peripheral surface 15B1 of the outer race 14, the rolling direction of the thrust roller 19 and the moving direction of the cage separate body 42 can be made to match each other, and misalignment between each thrust roller 19 and each cage separate body 42 can be prevented.

In the hydraulic excavator 1 according to the second embodiment, the thrust cage 41 is constituted by the cage separate bodies 42 as described above, and its basic action has no particular difference from that in the above-described first embodiment.

That is, according to the second embodiment, since it is configured such that the one projecting portion 43 is provided on the outer wall surface 42C1 of the cage separate body 42, when the cage separate body 42 is displaced toward the inner peripheral surface 15B1 side of the outer race 14 (when being pressed onto the inner peripheral surface 15B1 of the outer race 14), the top portion 43A of the projecting portion 43 of the cage separate body 42 and the end edge portion 42C2 of the outer wall surface 42C1 are brought into contact with (sliding) the inner peripheral surface 15B1 of the outer race 14.

In this case, it is configured such that the virtual line Y-Y connecting the contact point S between the inner peripheral surface 15B1 of the outer race 14 and the projecting portion 43 and the contact point S' between the virtual projecting portion 43' provided symmetrically to the projecting portion 43 and the inner peripheral surface 15B1 of the outer race 14 is perpendicular to the roller center axis X-X. Thereby, the center axis P-P of the pocket 42E of the cage separate body 42 is perpendicular to the rolling direction of the thrust roller 19.

Thus, when the top portion 43A of the projecting portion 43 and the end edge portion 42C2 of the outer wall surface 42C1 are brought into contact with the inner peripheral surface 15B1 of the outer race 14, the rolling direction of the thrust roller 19 and the moving direction of the cage separate body 42 match each other. Therefore, misalignment between the thrust roller 19 (the center axis X-X thereof) and the cage separate body 42 (the center axis P-P of the pocket 42E thereof) can be prevented, and abnormal wear and damage on the inner surface of the pocket 42E of the cage separate body 42 can be prevented. As a result, durability and reliability of the revolving bearing 11 can be improved.

According to the second embodiment, since the projecting portion 43 is configured to project toward the inner peripheral surface 15B1 of the outer race 14 from the outer wall surface 42C1 of the cage separate body 42, misalignment can be prevented as described above without increasing the dimension of the cage separate body 42 relating to the peripheral directions of the inner race 12 and the outer race 14. In other words, by providing the one projecting portion 43 on the outer wall surface 42C1 of the cage separate body 42, misalignment can be prevented without decreasing the number of the thrust rollers 19 incorporated in the revolving bearing 11. As a result, ensuring of the load capacity of the revolving bearing 11 and prevention of misalignment can be both realized.

It should be noted that in each of the above-described embodiments, the case in which the revolving bearing 11 is constituted by a three-row roller bearing obtained by combining a two-row thrust roller bearing and a one-row radial roller bearing was described as an example. However, the present invention is not limited to the same but the revolving bearing as a thrust roller bearing may be constituted as a single-row thrust roller bearing or a two-row roller bearing obtained by combining a single-row thrust roller bearing and a single-row radial roller bearing and the like, for example. In short, it is only necessary that the revolving bearing is constituted by at least a one-row thrust roller bearing.

In the above-described first embodiment, the case in which the projecting portions 24 and 25 are provided on the outer wall surface 23C1 of the first cage separate body 23 and the projecting portion 28 is provided on the outer wall surface 27A1 of the second cage separate body 27 was described as an example. However, the present invention is not limited to the same, and a configuration may be adopted in that the projecting portion is provided only on the cage separate body constituting one of the thrust cages.

In each of the above-described embodiments, the case in which the wall surfaces of the projected partition portions 23A and 42A of each of the cage separate bodies 23 and 42 are made as the projected surfaces 23A1 and 42A1 having a polygonal surface shape was described as an example. However, the present invention is not limited to the same but the wall surface of the projected partition portion may be a projected surface having an arc surface shape, for example.

In each of the above-described embodiments, the hydraulic excavator 1 was described as an example of a revolving type construction machine, but the present invention is not limited to the same and may be applied to other construction machines provided with a revolving apparatus such as a hydraulic crane and the like, for example.

Moreover, in the above-described embodiments, the revolving bearing was described as an example of a thrust roller bearing, but the present invention is not limited to the same but may be widely applied as a thrust roller bearing constituting various types of rotation support mechanisms.

DESCRIPTION OF REFERENCE NUMERALS

11: Revolving bearing (Thrust roller bearing)
12: Inner race
14: Outer race
18: Roller accommodating space
15B1, 16A1: Inner peripheral surface
19, 20: Thrust roller (Roller)
22, 26, 41: Thrust cage (Cage)
23, 27, 42, 100: Cage separate body
23C1, 27C1, 42C1, 100A: Outer wall surface
24, 25, 28, 43, 43': Projecting portion
24A, 25A, 28A, 43A: Top portion
42C2, 101, 102: End edge portion

The invention claimed is:

1. A thrust roller bearing provided with an inner race having an outer periphery side, an outer race adjacent to said outer periphery side of said inner race and having an inner peripheral surface side. an annular roller accommodating space between said inner peripheral surface side of said outer race and said outer periphery side of said inner race, a plurality of rollers arranged in said annular roller accommodating space, each of said rollers being capable of rolling around a roller center axis (X-X) which is perpendicular to a revolving axis (O-O) of said inner race and said outer race and each said roller center axis (X-X) extending in a radial direction of said thrust roller bearing and supporting said inner race and said outer race capable of relative rotation, and a cage provided in said annular roller accommodating space for retaining each said roller capable of rolling, characterized in that:

said outer race includes said inner peripheral surface side, with which said cage is capable of making contact, and an outer race side thrust raceway surface on which each of said plurality of rollers rolls:

said cage is composed of a plurality of cage separate bodies which are separated from each other and which are arranged in said annular roller accommodating space over an entire circumferential length of said annular roller accommodating space;

each said cage separate body is configured having two projecting portions which are projecting from each said cage separate body radially toward said inner peripheral surface side of said outer race, said two projecting portions being spaced apart from each other in a peripheral direction of said outer race on an outer wall surface of each said cage separate body opposed to said inner peripheral surface side of said outer race; and a top portion of each said projecting portion of each said cage separate body is brought into contact with said inner peripheral surface side of said outer race when each of said cage separate bodies is displaced toward said inner peripheral surface side of said outer race.

2. The thrust roller bearing according to claim 1, wherein when said top portion of each said projecting portion of each said cage separate body is brought into contact with said inner peripheral surface side of said outer race, a virtual line (Y-Y) connecting contact points (S) between said inner peripheral surface side of said outer race and each of said projecting portions is configured to be perpendicular to said roller center axis (X-X).

3. The thrust roller bearing according to claim 1, wherein a distance dimension between one of said two projecting portions of a cage separate body and said roller center axis (X-X) is (A), a distance dimension between the other projecting portion of said two projecting portions of a cage separate body and said roller center axis (X-X) is (B), a height dimension of one of said two projecting portions is (C), and a height dimension of the other projecting portion is (D), the dimensions are set to A=B, C=D.

4. The thrust roller bearing according to claim 3, wherein a radius of each said roller of said plurality of rollers is (R), $0.6R \leq A=B \leq R$ is set.

5. A thrust roller bearing provided with an inner race having an outer periphery side, an outer race provided adjacent to said outer periphery side of said inner race and having an inner peripheral surface side, an annular roller accommodating space between said inner peripheral surface side of said outer race and said outer periphery side of said inner race, a plurality of rollers arranged in said annular roller accommodating space, each of said rollers being capable of rolling around a roller center axis (X-X) which is perpendicular to a revolving axis (O-O) of said inner race and said outer race and each said roller center axis X-X extending in a radial direction of said thrust roller bearing and supporting said inner race and said outer race capable of relative rotation, and a cage provided in said annular roller accommodating space for retaining each said roller capable of rolling, characterized in that:

said cage is configured by a plurality of cage separate bodies which are separated from each other and which are arranged in said annular roller accommodating space over an entire circumferential length of said annular roller accommodating space;

each of said cage separate bodies is configured having one projecting portion projecting from each said cage separate body radially toward said inner peripheral surface side of said outer race, said one projecting portion being spaced apart from said roller center axis (X-X) in a peripheral direction of said outer race on an outer wall surface of each said cage separate body opposed to said inner peripheral surface side of said outer race; wherein, when each said cage separate body is displaced toward said inner peripheral surface side of said outer race, an end edge portion on a side of each said cage separate body, opposite to said projecting portion and sandwiching said roller center axis (X-X) in said outer wall surface, and a top portion of said projecting portion is brought into contact with said inner peripheral surface side of said outer race; and wherein, when said top portion of said one projecting portion of each said cage separate body and said end edge portion of said outer wall surface are brought into contact with said inner peripheral surface side of said outer race, a tangent (Z-Z) with said inner peripheral surface side, at an intersection (K) between said roller center axis (X-X) and said inner peripheral surface side of said outer race, is configured to be perpendicular to said roller center axis (X-X).

\* \* \* \* \*